June 19, 1956   G. J. MEYER   2,750,867
VENTING DEVICE FOR COOKING STOVES
Filed Oct. 11, 1954
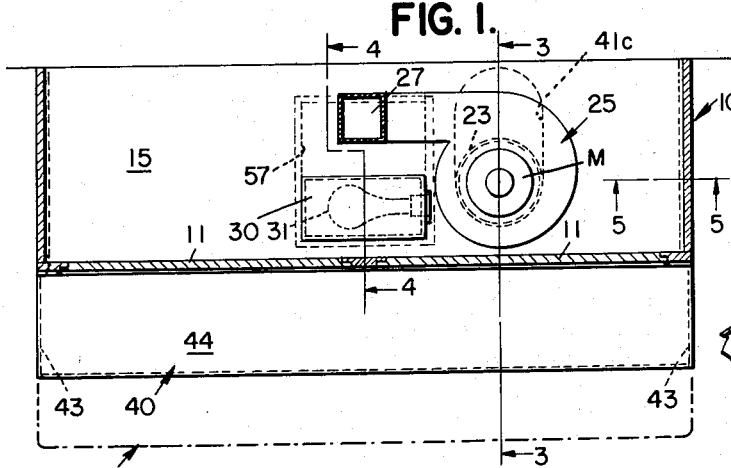
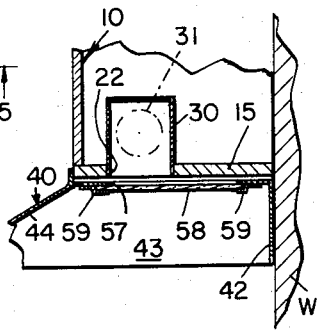
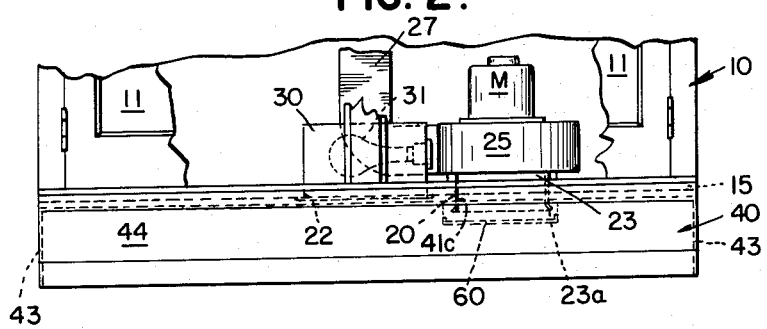
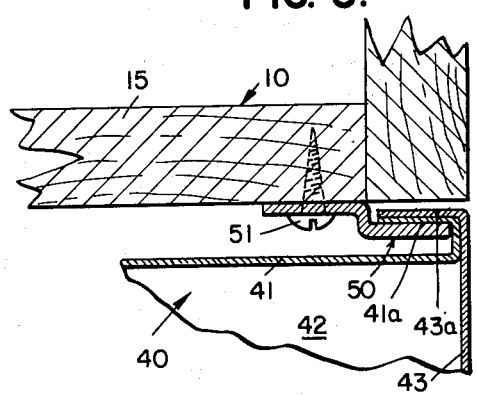
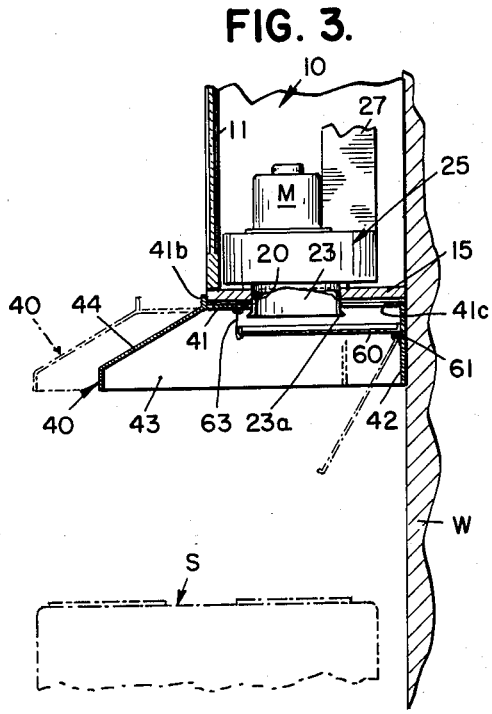
INVENTOR
GEORGE J. MEYER
BY
ATTORNEYS

United States Patent Office 2,750,867
Patented June 19, 1956

2,750,867

VENTING DEVICE FOR COOKING STOVES

George J. Meyer, Pomona, Calif.

Application October 11, 1954, Serial No. 461,503

6 Claims. (Cl. 98—115)

My invention has to do with venting devices for cooking stoves and relates more particularly to devices for catching and exhausting grease-laden smoke produced by cooking on a stove.

While it is well known to mount hoods over cooking stoves, in the case of home kitchens it has been deemed undesirable to make the hood of a size sufficiently large to overhang the front burners of the stove because, to do so, would require that the hood project so far beyond the front surfaces of the kitchen cabinets that it would be unsightly and in the way most of the time.

It is an object of my invention to provide a cooking stove venting system utilizing a hood which is so constructed and adjustably mounted on a kitchen cabinet or other support over a stove that, when the front burners of the stove are not being used, the hood may be pushed inwardly towards the wall, but when the front burners are being used the hood may be pulled outwardly into position overhanging even the front burners of the stove.

It is a further object to provide a cooking stove venting system of this character wherein the blower element may be stationarily mounted in a conventional kitchen cabinet over a stove without interfering with the free exposure of the blower inlet to grease-laden smoke emanating from the stove, regardless of the position of adjustment of the hood.

It is another object to provide in a system of this character means for illuminating the top of the stove from a light source within a kitchen cabinet, regardless of the position of adjustment of the hood.

It is another object to provide a system of this character including a member which serves the double function of a drip pan and a baffle, the function of the baffle being to control the efficiency of the blower regardless of the position of adjustment of the hood.

Other objects and advantages will appear hereinafter.

While I point out in the appended claims the features of my invention which I believe to be new, I shall now, for the purpose of explaining my invention, describe one of its presently preferred embodiments, for which purpose I shall refer to the accompanying drawing wherein:

Fig. 1 is a sectional top plan view;

Fig. 2 is a front elevation;

Fig. 3 is a section taken on line 3—3 of Fig. 1;

Fig. 4 is a section taken on line 4—4 of Fig. 1; and

Fig. 5 is an enlarged section taken on line 5—5 of Fig. 1.

Referring now to the drawing, the letter S denotes a conventional cooking stove mounted adjacent the wall W of a conventional kitchen and 10 denotes a conventional kitchen cabinet supported from the wall above the stove, the cabinet having the usual hinged front doors 11. The bottom wall 15 of the cabinet has an air inlet opening 20 and an opening 22 for a lighting member to be described. A conduit 23 is fixed in opening 20 and depends below the bottom of wall 15, flaring somewhat at its bottom end 23a.

Suitably secured to the floor of the cabinet, with its inlet in register with opening 20, I mount a conventional blower element 25 driven as by a conventional electric motor M. The outlet conduit 27 from the blower communicates with the blower outlet and thence extends upwardly to be connected with an outlet conduit through the roof of a building.

A light housing 30 is affixed to the floor of the cabinet with its open bottom end in register with opening 22, a conventional light bulb 31 being mounted in the housing 30. Both the bulb 31 and motor M are, of course, connected to an electrical source by conventional wiring, not shown.

On the bottom surface of the cabinet 10, I slidably mount a hood member 40 having a flat top wall 41, a back wall 42, end walls 43, and a diagonally, downwardly and forwardly disposed front wall 44.

The means for slidably mounting the hood on the cabinet are best shown in Fig. 5 and includes a pair of track members 50 secured to the bottom surface of the cabinet floor, one adjacent each end, as by screws 51. The top wall 41 of the hood, as well as the end walls 43, have flanged portions 41a, 43a, respectively, which are formed to overlie and slide along the respective track members 50, permitting the hood to be moved between its inner or full-line position of Fig. 3 and its outer or broken-line position of Fig. 3. The front wall of the hood has a top flange 41b which engages the front of the cabinet adjacent its bottom when the hood is in its inner position.

In the top wall of the hood, in register with opening 20 in the bottom of the cabinet, I provide an elongated opening 41c registering with opening 20 in the bottom wall of the cabinet, and an opening 57 covered by a transparent glass 58 slidably carried by the top wall of the hood by means of slides 59, so that the glass may be readily moved for cleaning purposes. Opening 57 is approximately twice the size of opening 22 so that the illuminating of the top of the stove by the bulb 31 will not be interfered with by moving the hood from one position of adjustment to another.

Underlying the blower inlet opening, in spaced relation to the top wall of the hood, I provide a drip pan 60 which is hinged at 61 to the back wall of the hood. This drip pan is supported at its free end in horizontal position, by a hook member 63 pivotally attached to the top wall of the hood or by any other suitable means. This drip pan also functions as a baffle to direct the exhausting efficiency of the blower towards the front burners of the stove, or it may be released from the hook and allowed to hang, as shown by the broken line in Fig. 3, when the hood is in its inner position.

It will be understood, of course, that within the purview of the appended claims my invention is susceptible of various modifications which the specific structure illustrated and described hereinafter will suggest to those skilled in the art.

I claim:

1. In a venting system the combination of a cabinet having a bottom wall presenting a pair of openings therein, a blower mounted in said cabinet with its inlet communicating with one of said openings, a light source mounted in said cabinet in register with the other of said openings, a pair of track members secured to said bottom wall, and a hood slidably suspended from said track members, said hood having a top wall presenting a pair of openings in register with said openings in said bottom wall of said cabinet.

2. In a venting system the combination of a cabinet having a bottom wall presenting a light-passing opening and an air-passing opening, a blower mounted in said cabinet with its inlet communicating with said air-passing opening, a light source mounted in said cabinet in register with said light-passing opening, a pair of track members secured to said bottom wall, a hood slidably suspended from said track members, said hood having a top wall presenting an opening substantially twice the area of said light-passing opening in said bottom wall and registering therewith and presenting an air-passing opening substantially twice the area of said air-passing opening in said bottom wall and registering therewith.

3. The system of claim 2 wherein a sheet of transparent material is slidably carried by the top wall of said hood in position underlying the said light-passing opening therein.

4. The system of claim 2 which additionally includes a conduit fixed in said air-passing opening in said bottom wall of said cabinet and depending therefrom through said air-passing opening in the top wall of said hood.

5. In a venting system including a cabinet having a bottom wall presenting an opening and carrying a blower having an inlet conduit communicating with said opening, the combination, with said cabinet, of track members secured to the bottom wall of said cabinet at opposite sides of said inlet and a hood slidably suspended from said track members, said hood having a top wall presenting an elongated outlet opening communicating with said inlet, and said conduit projecting downwardly through said elongated outlet opening.

6. In a venting device, a cabinet having a bottom wall presenting an opening, a blower mounted in said cabinet and having an inlet communicating with said opening, a hood, means slidably supporting said hood from the bottom of said cabinet for horizontal sliding movement relative to said cabinet whereby to adjust the position of said hood relative to said cabinet, said hood having a top wall presenting an elongated opening registerable with said opening in said bottom wall of said cabinet in any position of said adustment.

References Cited in the file of this patent

UNITED STATES PATENTS

| | | |
|---|---|---|
| 173,294 | Hockman | Feb. 8, 1876 |
| 2,341,245 | Sonntag | Feb. 8, 1944 |
| 2,528,844 | Robertson | Nov. 7, 1950 |
| 2,535,707 | Vezey | Dec. 26, 1950 |